Feb. 1, 1944.   T. R. SWEET   2,340,496
ELECTRODE HOLDER
Filed Sept. 18, 1942
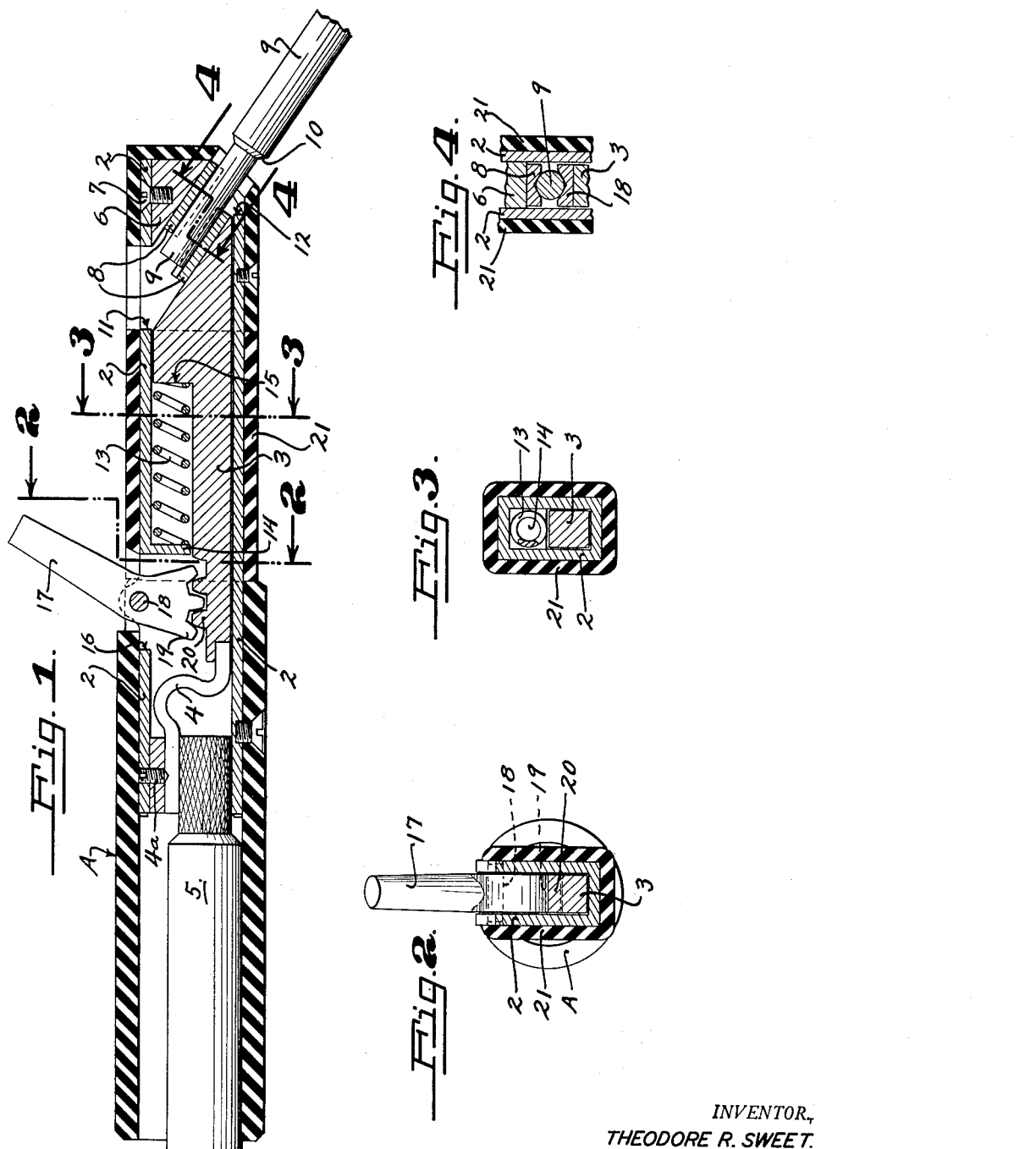
INVENTOR,
THEODORE R. SWEET.
BY
Chas. E. Townsend.
ATTORNEY.

Patented Feb. 1, 1944

2,340,496

UNITED STATES PATENT OFFICE 2,340,496

ELECTRODE HOLDER

Theodore R. Sweet, Richmond, Calif.

Application September 18, 1942, Serial No. 458,770

1 Claim. (Cl. 219—8)

This invention relates to electric welding apparatus and particularly to an electrode holder.

Among the objects of the invention are to provide a simple, compact, safe and durable holder which is easy to manufacture and easy of operation; to provide a holder which will have its gripping surfaces which contact the welding rod so designed and arranged as to afford a maximum of electrical contact and which will grasp firmly and hold the welding rod against movement; and to provide a holder which will avoid the undesired phenomenon known to the trade as "arc blow."

Having reference to the accompanying drawing:

Fig. 1 is a side elevation, in section, drawn to scale and of the dimensions of a full-size machine.

Fig. 2 is a cross section on line 2—2 of Fig. 1.

Fig. 3 is a cross section on line 3—3 of Fig. 1.

Fig. 4 is a cross section on line 4—4 of Fig. 1.

The device comprises an insulated handle portion A, into which is fitted a metal casing 2 which, in practice, is of ten-gauge mild steel. For convenience, the casing is rectangular in cross section but, obviously, it could be of any desired shape and size.

Casing 2 houses a slidable jaw member 3 which has at the handle end a pigtail or flexible connection 4, of copper, with the current-carrying cable 5. Proper electrical contact between the flexible connection 4 and cable 5 is maintained by an Allen set-screw 4ª. A fixed jaw 6 is secured at the opposite end and within the casing 2; being removably held in place by suitable means, as the screw 7. Both jaws 3 and 6 are, like the casing, made preferably of mild steel.

The adjacent jaw faces are correspondingly beveled and faced with copper contact pieces 8, between which an electrode or welding rod 9 is adapted to be gripped firmly and held in operative position. The rod is shown with the usual flux coating 10. The casing 2 has top and bottom openings 11 and 12 in line with the open space between the adjacent jaw surfaces and through which the rod passes.

The movable jaw 3 is adapted to be held normally in gripping contact with the rod by means of a coiled expansion spring 13 which is housed in the casing and abutting against a stop 14 in the casing and against a shoulder 15 formed on the jaw. The spring, being uninsulated, is always in electrical contact with both the casing and the jaw 3. Experience shows it is not subject to deterioration in use.

Any suitable means may be employed to reciprocate the jaw 3 to retract it to allow of the insertion or removal of a welding rod. As shown, the top of the casing is slotted, as at 16, to admit of insertion of a trigger member 17, which is pivoted at 18. The lower portion of the trigger is provided with a gear segment 19 engaging a rack portion 20 on the adjacent upper face of the movable jaw. That portion of the casing 2 between the handle and welding rod is insulated, as at 21, by a permanent insulation while the portion which carries the fixed jaw 6 is covered with a burned-off insulation which can be replaced as occasion requires.

In practical operation, a welding rod 9 is inserted into the holder by a depression of the trigger to retract the movable jaw. Releasing the trigger, the spring 13 impels the jaw 3 into gripping engagement with the rod 9 and clamps it against the contact surface 8 of the fixed jaw. The spring 13 is of sufficient stiffness and possessed of such expansive force, while the inclination of the opposed gripping surfaces of the jaws is such that, on release of the trigger, the jaw 3 exerts a wedge action on the rod, which action I chose to term as a slip-grip, being a combination rectilinear movement with a wedging action downward on the rod. The result is that a firm grip is exerted on the rod and a maximum of electrical contact with the rod assured. In practice, the inclination of adjacent parallel faces of the jaws is approximately thirty degrees, but I do not wish to be limited to any specific inclination.

Experience has shown that by the use of the steel casing in conjunction with the steel jaws constructed and arranged in the manner shown and described, I have been able to do away to a great extent with the undesired phenomenon known to the welding trade as "arc blow" which is manifested by the spattering of the welding material with very unsatisfactory welding results. The device has high visibility range, allowing the operator to use an electrode down to the fullest extent of its flux coating.

I claim:

An electrode holder for electric welding apparatus comprising in combination a metallic casing which is rectangular in cross section and enclosing a pair of gripping members, one of which is stationary and the other movable and having inclined parallel adjacent gripping faces, the casing having top and bottom apertures in line with the spacing between the gripping members through which a welding rod may be inserted and gripped, said faces of the grippers being provided with copper contacts for better conductivity, the movable gripper having a sliding fit in the casing, an expansion spring in circuit with the movable gripper and acting against the gripper and against an inwardly projecting abutment on the casing, an extension of the gripper beyond the spring abutment and having a rack portion, a trigger pinion member pivoted in the casing and extending through the casing and engaging said rack to oscillate the movable gripper against the expansive action of the spring, and an electric cable with a pigtail twist connected to the movable gripper and to a source of electrical supply, the entire casing, except for the openings for the welding rod and for the passage of the trigger, being insulated.

THEODORE R. SWEET.